United States Patent [19]

Baur et al.

[11] Patent Number: 5,800,602
[45] Date of Patent: Sep. 1, 1998

[54] USE OF INCLUSION COMPOUNDS OF CYCLIC POLYSACCHARIDES AS CHARGE CONTROL AGENTS

[75] Inventors: Rüdiger Baur, Eppstein; Hans-Tobias MacHoldt, Darmstadt-Eberstadt, both of Germany

[73] Assignee: Hoechst Aktiengesellschaft, Frankfurt, Germany

[21] Appl. No.: 647,067

[22] Filed: May 9, 1996

[30] Foreign Application Priority Data

May 10, 1995 [DE] Germany ............... 19517034.2

[51] Int. Cl.[6] ............... C08L 5/00; G03G 9/135
[52] U.S. Cl. ............... 106/162.2; 106/205.1; 106/205.3; 106/205.2; 106/205.6; 106/205.7; 106/205.71; 106/205.72; 106/205.9; 106/217.5; 106/217.6; 106/217.7; 106/217.9; 430/110; 524/27; 524/28
[58] Field of Search ............... 106/162.2, 205.1, 106/205.3, 205.2, 205.6, 205.7, 205.71, 205.72, 205.9, 217.5, 217.6, 217.7, 217.9; 430/110; 524/27, 28

[56] References Cited

U.S. PATENT DOCUMENTS

| | | |
|---|---|---|
| 4,656,112 | 4/1987 | Kawagishi et al. . |
| 4,683,188 | 7/1987 | Suzuki et al. . |
| 4,684,596 | 8/1987 | Bonser et al. . |
| 4,789,614 | 12/1988 | Bugner et al. . |
| 5,069,994 | 12/1991 | Gitzel et al. . |
| 5,187,038 | 2/1993 | Gitzel et al. . |
| 5,281,709 | 1/1994 | Akiyama et al. . |
| 5,344,673 | 9/1994 | Hotta et al. . |
| 5,352,521 | 10/1994 | Hotta et al. . |
| 5,422,227 | 6/1995 | Hotta et al. . |
| 5,492,615 | 2/1996 | Houman ............... 205/238 |
| 5,501,934 | 3/1996 | Sukata et al. ............... 430/110 |

FOREIGN PATENT DOCUMENTS

| | | |
|---|---|---|
| WO 95 04084 A | 2/1995 | Canada . |
| 0367162 | 5/1990 | European Pat. Off. . |
| 0469544 | 2/1992 | European Pat. Off. . |
| 0476647 | 3/1992 | European Pat. Off. . |
| 0 640 883 A | 3/1995 | European Pat. Off. . |
| 4037518 | 5/1991 | Germany . |
| 4029653 | 3/1992 | Germany . |
| 4321289 | 1/1995 | Germany . |
| 6-118719 A | 8/1994 | Japan . |
| 63 194 946 A | 2/1995 | Japan . |

OTHER PUBLICATIONS

Higashiyama, Y., et al, *J. of Electrostatics 30*: 203–212 (1993) no month avail.

Szejtli J., "Cyclodextrin Technology", 1988, no month avail. Kluwer Academic Publishers, Dordrecht, The Netherlands.

*Primary Examiner*—David Brunsman
*Attorney, Agent, or Firm*—Susan S. Jackson

[57] ABSTRACT

Inclusion compounds consisting of a host compound, which is a cyclically linked polysaccharide having 3 to 100 monomeric saccharide units and forming a cavity in its molecular framework, and of one or more chemical compounds which are included in this cavity as guest compound(s), are used as charge control agents and charging improvers in electrophotographic toners and developers, in triboelectrically or electrokinetically sprayable powders and powder coatings and in electret materials.

14 Claims, No Drawings

USE OF INCLUSION COMPOUNDS OF CYCLIC POLYSACCHARIDES AS CHARGE CONTROL AGENTS

The present invention is within the technical field of charge control agents in toners and developers for electrophotographic recording processes, in powders and power coatings for surface coating, in electret materials, especially in electret fibers, and in separation processes.

In electrophotographic recording processes a "latent charge image" is produced on a photoconductor. This image is developed by applying an electrostatically charged toner which is then transferred to, for example, paper, textiles, foils or plastic, and is fixed by means, for example, of pressure, radiation, heat or the effect of solvent (L. B. Schein, "Electrophotography and Development Physics"; Springer Series in Electrophysics 14; Springer-Verlag Verlag, 1988).

One measure of the quality of the toner is its specific charge q/m (charge per unit mass). In addition to the sign and level of the electrostatic charge, the principal, decisive quality criteria are the rapid attainment of the desired charge level and the constancy of this charge over an extended activation period. In addition to this, the insensitivity of the toner to climatic effects such as temperature and atmospheric humidity is a further important criterion for its suitability.

Both positively and negatively chargeable toners are used in copiers and laser printers, depending on the type of process and type of apparatus.

To obtain electrophotographic toners or developers having either a positive or negative charge, it is common to add so-called charge control agents. Since the charge of toner binders is in general heavily dependent on the activation period, the function of a charge control agent is, on the one hand, to set the sign and level of the toner charge and, on the other hand, to counteract the charge drift of the toner binder and to provide for constancy of the toner charge.

Charge control agents which are not able to prevent the toner or developer showing a high charge drift (aging) during a prolonged period of use, and which may even cause the toner or developer to undergo charge inversion, are therefore unsuitable for practical use.

While for black toners it is possible to employ black, blue or dark charge control agents, coloristic factors demand, for color toners, charge control agents without an inherent color.

In the case of full color toners, in addition to the precisely defined requirements in terms of color, the three toners, yellow, cyan and magenta, must also be matched exactly to one another in terms of their triboelectric properties, since they are transferred in succession in the same apparatus.

It is known that colorants may have a sustained effect on the triboelectric charge of toners (H.-T. Macholdt, A. Sieber, Dyes & Pigments 9 (1988), 119–127). Because of the different triboelectric effects of colorants and the resulting effect, sometimes very pronounced, on toner chargeability, it is not possible simply to add the colorants to a toner base formulation made available at the start. On the contrary, it may be necessary to make available for each colorant an individual formulation to which the nature and amount of the required charge control agent are tailored specifically.

Since this procedure is highly laborious, there is a need for highly effective, colorless charge control agents which are able to compensate for the different triboelectric characteristics of different colorants and to give the toner the desired charge. In this way, colorants which are very different triboelectrically can be employed in the various toners required (yellow, cyan, magenta and if desired black) using one and the same charge control agent, on the basis of a toner base formulation made available at the start.

Another important practical requirement is that the charge control agents should have high thermal stability and good dispersibility. Typical temperatures at which charge control agents are incorporated into the toner resins, when using kneading apparatus and extruders, are between 100° C. and 200° C. Correspondingly, thermal stability at 200° C., and better still at 250° C., is a great advantage. It is also important for the thermal stability to be ensured over a relatively long period (about 30 minutes) and in a variety of binder systems. This is significant because matrix effects occur again and again and lead to the premature decomposition of the charge control agent in the toner resin, causing the toner resin to turn a dark yellow or dark brown color and the charge control effect to be wholly or partly lost. Typical toner binders are addition polymerization, polyaddition and polycondensation resins, such as styrene, styrene-acrylate, styrene-butadiene, acrylate, polyester and phenolic-epoxy resins, individually or in combination, which may also contain further components, such as colorants, waxes or flow assistants, or may have these components added subsequently.

It is of great advantage for its good dispersibility if the charge control agent has, as far as possible, no wax-like properties, no tackiness, and a melting or softening point of >150° C., preferably >200° C. Tackiness frequently causes problems during metered addition to the toner formulation, and low melting or softening points may lead to inhomogeneous distribution during dispersion, caused by the material coalescing in drops in the carrier material.

Apart from their use in electrophotographic toners and developers, charge control agents may also be used to improve the electrostatic charge of powders and coatings, especially in triboelectrically or electrokinetically sprayed powder coatings as are used to coat surfaces of articles made from, for example, metal, wood, plastic, glass, ceramics, concrete, textile material, paper or rubber. Powder coating technology is used, for example, when coating articles such as garden furniture, camping equipment, domestic appliances, vehicle components, refrigerators and shelving, and for coating workpieces of complex shape. The powder coating or the powder receives its electrostatic charge, in general, according to one of the two following processes:

a) in the corona process, the powder coating or the powder is guided past a charged corona and is charged in the process;

b) in the triboelectric or electrokinetic process, the principle of frictional electricity is utilized.

The powder coating or the powder in the spray apparatus receives an electrostatic charge which is opposite to the charge of its friction partner, generally a hose or spray tube made, for example, of polytetrafluoroethylene.

It is also possible to combine the two processes. Typical powder coating resins employed are epoxy resins, polyester resins containing carboxyl and hydroxyl groups, polyurethane resins and acrylic resins, together with the customary curing agents. Combinations of resins are also used. For example, epoxy resins are often employed in combination with polyester resins containing carboxyl and hydroxyl groups.

Examples of typical curing components for epoxy resins are acid anhydrides, imidazoles and dicyandiamide, and derivatives thereof. Examples of typical curing components for polyester resins containing hydroxyl groups are acid anhydrides, blocked isocyanates, bisacylurethanes, phenolic resins and melamine resins. Examples of typical curing components for carboxyl-containing polyester resins are triglycidyl isocyanurates or epoxy resins. Typical curing components used in acrylic resins are, for example, oxazolines, isocyanates, triglycidyl isocyanurates or dicarboxylic acids.

The disadvantage of insufficient charge can be seen above all in triboelectrically or electrokinetically sprayed powders and powder coatings which have been prepared using polyester resins, especially carboxyl-containing polyesters, or using so-called mixed powders, also referred to as hybrid powders. Mixed powders are powder coatings whose resin base comprises a combination of epoxy resin and carboxyl-containing polyester resin. The mixed powders form the basis of the powder coatings used most commonly in practice. Inadequate charging of the abovementioned powders and powder coatings results in inadequate throwing power and an inadequate deposition rate on the workpiece to be coated. The term "throwing power" is a measure of the extent to which a powder or powder coating is deposited on the workpiece to be coated, including its rear faces, cavities, fissures and, in particular, its inner edges and angles.

It has additionally been found that charge control agents are able considerably to improve the charging and the charge stability properties of electret materials, especially electret fibers (DE-A-43 21 289). Electret fibers have hitherto been described mainly in connection with the problem of filtering very fine dusts (e.g. von Biermann, "Evaluation of permanently charged electrofibrous filters", 17th DOE Nuclear Air Cleaning Conference, Denver, USA (1982) and in Chemiefasern/Textilindustrie 40/92 (1990/91)). The filter materials described differ both in respect of the materials of which the fibers consist and with regard to the manner in which the electrostatic charge is applied to the fibers. Typical electret materials are based on polyolefins, halogenated polyolefins, polyacrylates, polyacrylonitriles, polystyrenes or fluorinated polymers, for example polyethylene, polypropylene, polytetrafluoroethylene and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates, and also mixtures thereof. Electret materials, especially electret fibers, can be used, for example, to filter (very fine) dusts. The electret materials can receive their charge in a variety of ways, for instance by corona charging or triboelectric charging.

It is additionally known that charge control agents can be used in electrostatic separation processes, especially in processes for the separation of polymers. For instance, using the example of the externally applied charge control agent trimethylphenylammonium tetraphenylborate, Y. Higashiyama et al. (J. Electrostatics 30 (1993), pp. 203–212) describe how polymers can be separated from one another for purposes of recycling. Without charge control agents, the triboelectric charging characteristics of low density polyethylene (LDPE) and high density polyethylene (HDPE) are extremely similar. Following the addition of charge control agents, LDPE takes on a highly positive and RDPE a highly negative charge, and the materials can thus be separated easily. In addition to the external application of the charge control agents it is also possible to conceive in principle of their incorporation into the polymer in order for example to shift the position of a polymer within the triboelectric voltage series and to obtain a corresponding separation effect. In this way it is likewise possible to separate other polymers, for example polypropylene (PP) and/or polyethylene terephthalate (PET) and/or polyvinyl chloride (PVC) from one another.

Salt minerals, for example, can likewise be separated with particularly good selectivity if they are surface-treated beforehand (surface conditioning) with an additive which improves the substrate-specific electro-static charge (A. Singewald, L. Ernst, Zeitschrift für Physikal. Chem. Neue Folge, Vol. 124, pp. 223–248 (1981)).

In addition, charge control agents are employed as electroconductivity providing agents (ECPAs) in inks for inkjet printers (JP 05 163 449-A).

Charge control agents are known from numerous literature references. However, the charge control agents known to date have a range of disadvantages which severely limit their use in practice or even, in some cases, render it impossible. For instance, charge control agents such as the heavy-metal complexes described in U.S. Pat. No. 4,656,112, or the azines and nigrosines described in U.S. Pat. No. 5,281,709 can on account of their inherent color not be used in colored toners or in white or colored powder coatings.

Colorless charge control agents based on ammonium and immonium (iminium) compounds are often sensitive to light or to mechanical effects (U.S. Pat. No. 4,683,188) and may be thermally labile, so that they form decomposition products which may have an adverse effect on the tribo-electric charging of the toner (U.S. Pat. No. 4,684,596) and/or have a strong inherent color, often dark brown. In addition to this they are often waxlike, and some are water-soluble and/or possess a low effectiveness as charge control agents.

Although suitable in principle, charge control agents based on highly fluorinated ammonium and immonium compounds (U.S. Pat. No. 5,069,994) have the disadvantage of a complex synthesis, resulting in high preparation costs for the corresponding substances, and are not sufficiently stable to heat.

Charge control agents based on polymeric ammonium compounds (U.S. Pat. No. 5,187,033) lead in some cases to an amine odor of the toner or developer, and the charge control properties of these substances can be altered relatively easily by oxidation and the absorption of moisture. Furthermore, the oxidation products are colored and therefore interfere, especially in color toners. The abovementioned charge control agents for electro-photographic toners and developers, because of their color and inadequate thermal stability, are unsuitable for use in the predominantly white or clear triboelectrically or electrokinetically sprayed powders and powder coatings. In addition, inadequate thermal stability severely restricts the use of such charge control agents, since powder coatings, for example, are baked at over 200° C. for 15 minutes. The charge control agents intended for powders and powder coatings, which are claimed in U.S. Pat. No. 5,069,994, are difficult to handle because of their waxy nature and water-solubility or hygroscopic nature, and are of only limited applicability.

The ammonium compounds described in U.S. Pat. No. 5,069,994 and in U.S. Pat. No. 5,187,038 have the disadvantages of inadequate thermal stability, incompatibility with specific polyester resin systems, and the high price.

Ammonium salts based on sulfoisophthalic acid and its derivatives, as described for example in U.S. Pat. No. 4,789,614, again have the disadvantage of low stability in common binder systems. For instance, incorporated in a concentration of 1% into a typical toner binder (styrene acrylate or polyester), they show marked yellowing after only a few minutes even at low temperatures (120° to 140° C.), rendering their practical use impossible.

The sulfoisophthalic acid resins claimed in U.S. Pat. Nos. 5,344,673 and 5,422,227 have the disadvantage that the action they display is only of pronounced extent if they are employed as the dominant carrier component, in which case they lead to systems whose negative charge is often unstable. In order to obtain charge stability or even to set a positive charge, additional charge control agent must be added to the binder.

The object of the present invention was consequently to find improved, particularly effective, colorless charge control agents. The intention is for the compounds not only to permit the rapid attainment and constancy of the charge but also to be of high thermal stability (decomposition temperature >200° C.). Moreover, these compounds should be readily dispersible, without decomposition, in various toner binders employed in practice, such as polyesters, polystyrene-acrylates or polystyrene-buta-dienes/epoxy resins. In addition, the compounds should be ecologically and toxicologically unobjectionable, i.e. nontoxic and free from heavy metals. Furthermore, their action should be independent of the resin/carrier combination, in order to open up broad applicability. They should likewise be susceptible of good dispersion, without decomposition, in common powder coating binders and electret materials, for example polyethylene-styrene (PES), epoxy-PES-epoxy hybrid, polyurethane and acrylic systems, and should not cause any discoloration of the resins.

It has surprisingly now been found that, from the multiplicity of known sugar compounds, certain substituted or unsubstituted inclusion compounds of cyclic polysaccharides possess good charge control properties and high thermal stability. Furthermore, these compounds are without inherent color and have very good dispersibility in different toner, powder coating and electret binders. Their particular advantage is that by an appropriate choice of inclusion compound it is possible to match the charge control properties, thermal stabilities and dispersion qualities to the particular requirements.

From the large number of sugar derivatives (saccharides) consisting of a multiplicity of mono-, di- and tri-saccharides, open-chain and cyclic oligosaccharides, polysaccharides, such as xanthans, to name only a few, the small group of cyclically linked polysaccharides, and among these in particular the cyclodextrins consisting of glucose units, because of their cyclic molecular frame-work display a particular propensity for including guest molecules and ions and incorporating them into the crystal lattice. They do this while retaining, in contrast to the majority of other sugar derivatives, which are often tacky or decompose readily, their for the most part crystalline behavior, advantageous free-flow properties and good thermal stability.

The present invention provides for the use of inclusion compounds consisting of a host compound, which is a cyclically linked polysaccharide having 3 to 100 monomeric saccharide units and forming a cavity in its molecular framework, and of one or more chemical compounds which are included in this cavity as guest compound(s), as charge control agents and charging improvers in electrophotographic toners and developers, in triboelectrically or electrokinetically sprayable powders and powder coatings and in electret materials.

Preferred host compounds in the context of the present invention are 1,4-linked pyranoses of the formula (I)

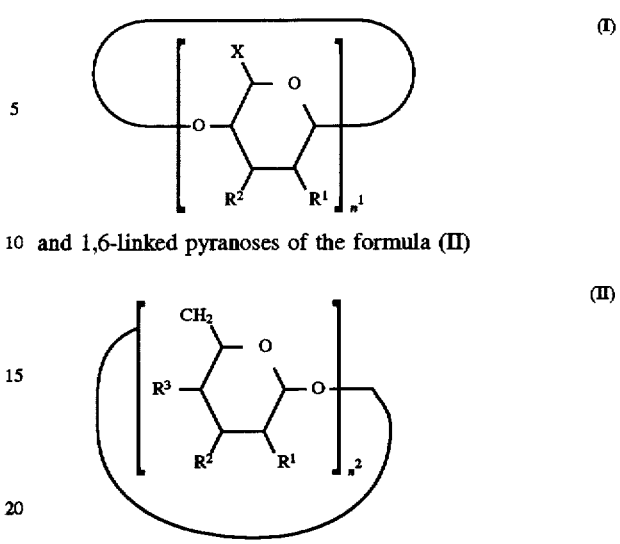

and 1,6-linked pyranoses of the formula (II)

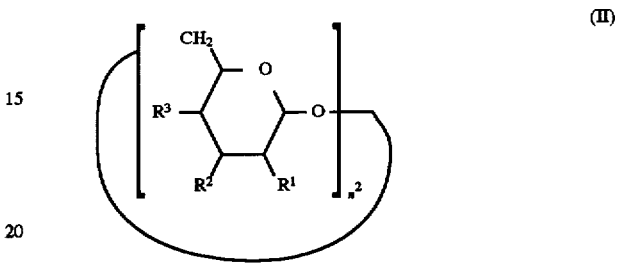

in which $n^1$ is a number from 6 to 100, preferably 6 to 80, particularly preferably 6 to 60, $n^2$ is a number from 3 to 100, preferably 3 to 60, $R^1$, $R^2$ and $R^3$ independently of one another are identical or different and are hydroxyl; branched or unbranched, cyclic or open-chain $C_1$–$C_{30}$-alkoxy; branched or unbranched, cyclic or open-chain $C_2$–$C_{30}$-alkenoxy, preferably vinyloxy or allyloxy, where the alkoxy and alkenoxy radicals mentioned can be partly or completely fluorinated; unsubstituted —O-aryl($C_6$–$C_{30}$), preferably —O-phenyl, or —O-aryl-($C_6$–$C_{30}$) which is substituted with 1 to 5 $C_1$–$C_{30}$-alkyl radicals or $C_1$–$C_{30}$-alkoxy radicals; —O—($C_1$–$C_4$)-alkyl-($C_6$–$C_{30}$)aryl; —O—$C_{60}$–$C_{70}$-fullerene; —O—(alkylene($C_0$–$C_{30}$)-Y-alkyl($C_1$–$C_{30}$))$_x$, —O-(aryl-($C_6$–$C_{30}$)—Y-aryl($C_6$–$C_{30}$))$_x$, —O-(aryl($C_6$–$C_{30}$)-Y-alkyl-($C_1$–$C_{30}$))$_x$, —O-(alkylene($C_0$–$C_{30}$)-Y-aryl ($C_6$–$C_{30}$)-alkyl-($C_0$–$C_4$))$_x$, where x is 1 to 30, preferably 1 or 2, and Y is a chemical bond, O, S, SO, $SO_2$, $PR^4$, $PR^4{}_3$, Si, $SiR_2{}^4$ or $NR^4$ and the radicals $R^4$ are hydrogen, $C_1$–$C_4$-alkyl or $C_{1-C_4}$-alkoxy, preferably a polyoxyethylene and/or polyoxypropylene radical of the formula —O—($C_2$–$C_3$-alkylene-O)$_x$—$R^5$ in which $R^5$ is hydrogen, $C_1$–$C_4$-alkyl, acetyl, benzoyl or naphthoyl; a radical —O—$COR^6$ in which $R^6$ is OH, saturated or unsaturated, branched or unbranched, cyclic or open-chain $C_1$–$C_{18}$-alkyl, partially fluorinated or perfluorinated ($C_1$–$C_{18}$)-alkyl, phenyl, $C_1$–$C_{18}$-alkyl-phenyl, preferably benzyl or tolyl;

a radical —O—$PR^7{}_2$ or —O—$PR^7{}_4$ in which $R^7$ is hydrogen, methyl, ethyl, propyl, butyl, vinyl, allyl, isopropyl, isobutyl, neopentyl, tert-butyl, cyclohexyl, cyclopentyl, phenyl, tolyl, benzyl, partially fluorinated or perfluorinated alkyl-($C_1$–$C_{18}$), and also O, OH, S and $NR^8{}_2$ in which $R^8$ is hydrogen, $C_1$–$C_8$-alkyl or phenyl, especially $PO(OH)_2$ or PO—(O—$C_6H_5$)$_2$;

a radical —O—$SO_2R^9$ in which $R^9$ is methyl, ethyl, propyl, butyl, vinyl, allyl, isopropyl, isobutyl, neopentyl, tert-butyl, cyclohexyl, cyclopentyl, phenyl, tolyl, benzyl, partially fluorinated or perfluorinated alkyl-($C_1$–$C_{18}$), O, $OR^8$, S or $NR^8{}_2$; a radical —O—$SiR^{10}{}_3$ in which $R^{10}$ is methyl, ethyl, propyl, butyl, vinyl, allyl, isopropyl, isobutyl, neopentyl, tert-butyl, cyclohexyl, cyclopentyl, phenyl, tolyl, partially fluorinated or perfluorinated alkyl-$(C_1-C_{18})$ O, $OR^8$, S or $NR^8_2$; a radical —O—$BR^{11}_2$ in which $R^{11}$ is methyl, ethyl, propyl, butyl, vinyl, allyl, isopropyl, isobutyl, neopentyl, tert-butyl, cyclohexyl, cyclopentyl, phenyl, tolyl, partially fluorinated or perfluorinated alkyl-$(C_1-C_{18})$, O, OH, $OR^8$, S or $NR^8_2$; an amino radical of the formula —$NH_2$, —$NHR^{12}$ or —$NR^{12}_2$ in which each $R^{12}$ is identical or different and is the radical of a $C_1-C_{30}$ aliphatic, $C_7-C_{60}$ araliphatic or $C_6-C_{30}$ aromatic hydrocarbon which can be interrupted by from 1 to 30 heteroatoms N, O and/or S;

an alkyl($C_1-C_{18}$) which is perfluorinated or partly fluorinated;

or in which the nitrogen atom of the amino radical is part of a saturated or unsaturated, aromatic or non-aromatic 5- to 7-membered ring system, preferably the piperidyl or pyridinium ring system, which can contain further heteroatoms, preferably nitrogen, oxygen, sulfur or a combination thereof, in the ring, especially the morpholinium ring system, and can be modified by fused attachment to or bridging to further ring systems, such as in particular the quinolinium ring system;

or an ammonium radical —$NR^{12}_4{}^+A^-$ in which $A^-$ is an inorganic or organic anion;

or an azide radical —$N_3$;

or in which the radicals $R^1$ and $R^2$, or $R^2$ and $R^3$, together form a ring system of the formula

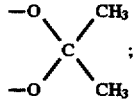

and

X is —$CH_2R^1$, 13 $CH_2$—$NO_2$, —$CH_2$—Hal, where Hal is halogen, preferably —$CH_2OH$, —$CH_2OCH_3$, —$CH_2OCO(C_1-C_4)$alkyl, —$CH_2$—O—$SiR_3^4$, —$CH_2$—O-trityl, —COOH, —$COO(C_1-C_4)$alkyl, —$CH_2$—O—$S_2$—$(C_1-C_4)$-alkyl or —$CH_2$—O—$SO_2$—$C_6H_4$—$(C_1-C_4)$-alkyl.

Suitable compounds in addition to the pyranoses mentioned are also the corresponding furanoses and mixtures of pyranoses with furanoses.

Suitable guest compounds which are included by said cyclically linked polysaccharides are all chemical compounds and ions whose molecular geometry permits this, such as organic and inorganic compounds, organometallic compounds, metal cations, inorganic or organic anions and betaines.

A precondition for the formation of an inclusion compound is that the guest compound is of a suitable size to settle in the cavity or to "dock". For example, the hosts 1 to 3 set out below have the following external and internal diameters:

| Host 1: | External diameter | 14.6 Å |
|---|---|---|
| | Internal diameter | 4.9 Å |
| Host 2: | External diameter | 15.4 Å |
| | Internal diameter | 6.2 Å |
| Host 3: | External diameter | 17.5 Å |
| | Internal diameter | 7.9 Å |

In order to form an inclusion compound, therefore, the guest compound should not be greater than the external diameter of the host. An additional possibility is that parts of molecules, for example substituents such as alkyl groups, settle in the cavity as anchors and thereby bind the guest to the host. Consequently, the formation of an inclusion compound within the meaning of the present invention may involve either complete incorporation of the guest compound or the incorporation of sterically appropriate parts of the molecule, such as substituents.

A diagrammatic representation of the three-dimensional form of the inclusion compounds which are employed in accordance with the invention is shown in formulae (IV) and (V), in which the truncated cone denotes a cyclically linked polysaccharide, as shown for example in formula (IV),

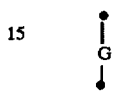

denotes the guest compound and [G]±denotes a guestion.

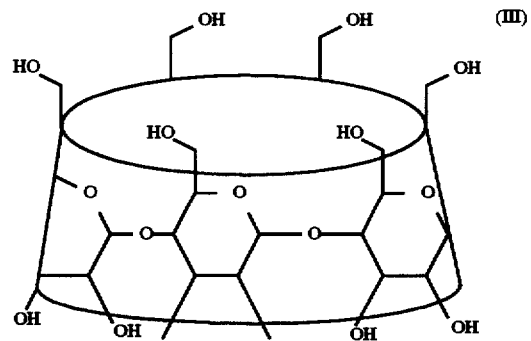

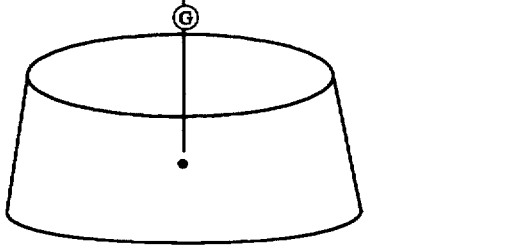

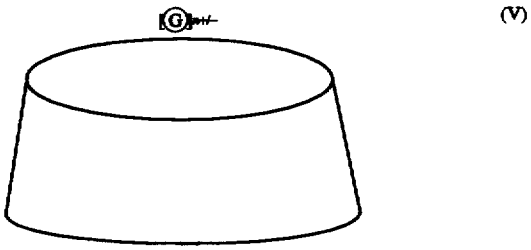

Host compounds which are of particular interest in the context of the present invention are those of the formulae (I) or (II) in which $R^1$, $R^2$ and $R^3$ independently of one another are hydroxyl, methoxy, ethoxy, propyloxy, isopropyloxy, n-butyloxy, isobutyloxy, tert-butyloxy, vinyloxy, allyloxy, phenoxy, benzyloxy, —O—$CF_3$, —O—$(CH_2CH_2$—O$)_x$—$R^5$, —O—$COR^{13}$ in which $R^{13}$ is $C_1-C_8$-alkyl, phenyl or $C_1-C_8$-alkyl-phenyl;

or an amino group —$NR^{14}R^{15}$ in which $R^{14}$ and $R^{15}$ independently of one another are hydrogen, methyl, ethyl, n-propyl, isopropyl, n-butyl, isobutyl, tert-butyl, allyl, vinyl, phenyl, benzyl or tolyl or in which the nitrogen atom is part of a piperidyl, morpholinyl, pyridinium or quinolinium ring system; or an amino group —N$^\oplus$HR$^{14}$R$^{15}$A$^\ominus$ in which A$^\ominus$ is a borate, sulfate, chloride, bromide, nitrate, cyanide, phosphate, carbonate, acetate or alcoholate anion, and X is —CH$_2$OH, —CH$_2$OCH$_3$, —CH$_2$Cl, —CH$_2$Br, —COOH, —COOCH$_3$, —CH$_2$—O—C(C$_6$H$_5$)$_3$, —CH$_2$—O—Si(CH$_3$)$_3$, —CH$_2$—O—SO$_2$—CH$_3$ or —CH$_2$—O—SO$_2$—C$_6$H$_4$CH$_3$.

Guest molecules or guest ions G which are of particular interest are:

- alcohols, branched or unbranched, saturated or unsaturated, substituted or unsubstituted, aromatic or aliphatic, cyclic or straight-chain;
- ketones, branched or unbranched, saturated or unsaturated, substituted or unsubstituted, aromatic or aliphatic, cyclic or straight-chain;
- aldehydes, branched or unbranched, saturated or unsaturated, substituted or unsubstituted, aromatic or aliphatic, cyclic or straight-chain; carboxylic acids, branched or unbranched, saturated or unsaturated, substituted or unsubstituted, aromatic or aliphatic, cyclic or straight-chain;
- polyalcohols, branched or unbranched, saturated or unsaturated, substituted or unsubstituted, aromatic or aliphatic, cyclic or straight-chain;
- quinones, substituted or unsubstituted;
- sugars, branched or unbranched, saturated or unsaturated, substituted or unsubstituted;
- ethers, branched or unbranched, saturated or unsaturated, substituted or unsubstituted, aromatic or aliphatic, cyclic or straight-chain;
- thiols, branched or unbranched, saturated or unsaturated, substituted or unsubstituted, aromatic or aliphatic, cyclic or straight-chain;
- cyano compounds, branched or unbranched, saturated or unsaturated, substituted or unsubstituted, aromatic or aliphatic, cyclic or straight-chain;
- aromatic or aliphatic nitro compounds;
- primary, secondary or tertiary amines NR3 in which R is H, OH, halogen or a hydrocarbon radical which is branched or unbranched, saturated or unsaturated, substituted or unsubstituted, aromatic or aliphatic, cyclic or straight-chain;
- organometallic compounds, for example ferrocene or metal alkyls;
- boron compounds BR$_3$ and BR$_4^-$, in which R is as defined above;
- silicon compounds SiR$_4$, in which R is as defined above;
- phosphorus compounds PR'$_3$, PR'$_5$ or PR'$_6$, in which R' is H, O, S, OH, halogen or an organic radical;
- sulfur compounds SR'$_2$, SR'$_3$, —SO$_3^-$, SR'$_4$, in which R' is as defined above;
- ammonium compounds NR$_4^+$, in which R is as defined above; inorganic cations, for example univalent, divalent, trivalent or tetravalent metal cations;
- univalent or divalent organic anions, such as carboxylate, phenolate, thiolate or alcoholate; or
- inorganic anions or salts of one of the organic or inorganic anions mentioned with one of the cations mentioned.

Examples of alcohols as guest molecules in the context of the novel use are C$_1$–C$_{30}$ aliphatic, C$_2$–C$_{30}$ olefinically unsaturated and C$_3$–C$_{30}$ cycloaliphatic alcohols, such as methanol, ethanol, n- and isopropanol, n-butanol, isobutanol and tert-butanol, pentanols, hexanols or cyclo-hexanol.

Examples of ketones as guest molecules in the context of the novel use are C$_3$–C$_{30}$ aliphatic, C$_4$–C$_{30}$ olefinically unsaturated, C$_4$–C$_{30}$ cycloaliphatic and C$_8$–C$_{30}$ aromatic ketones, such as acetone, butanone, acetophenone, benzophenone, benzalacetone, indanone, indanedione, acetylacetone, cyclopentanone, cyclohexanone, fluorenone, xanthone, benzil, pinacolone, pyruvic acid, phenylacetone, camphor, decanone, hexafluoroacetone, tropolone and hydrindantine.

Examples of aldehydes as guest molecules in the context of the novel use are C$_1$–C$_{30}$ aliphatic, C$_3$–C$_{30}$ olefinically unsaturated, C$_4$–C$_{30}$ cycloaliphatic and C$_7$–C$_{30}$ aromatic aldehydes, such as formaldehyde, acetaldehyde, propionaldehyde, benzaldehyde, acrolein, butyraldehyde, isobutyraldehyde, glyoxal, crotonaldehyde, salicylaldehyde, anisaldehyde and cinnamaldehyde.

Examples of carboxylic acids as guest molecules in the context of the novel use are C$_1$–C$_{30}$ aliphatic, C$_3$–C$_{30}$ olefinically unsaturated, C$_4$–C$_{30}$ cycloaliphatic and C$_7$–C$_{30}$ aromatic carboxylic acids; C$_2$–C$_{30}$ aliphatic, C$_4$–C$_{30}$ olefinically unsaturated and C$_8$–C$_{30}$ aromatic dicarboxylic acids and also tricarboxylic acids; examples are formic acid, acetic acid, propionic acid, butyric acid, valeric acid, caproic acid; fatty acids, such as oleic acid, stearic acid, lauric acid and palmitic acid; oxalic acid, malonic acid, succinic acid, glutaric acid, adipic acid, maleic acid, fumaric acid, citric acid, tartaric acid, citric acid, benzoic acid, salicylic acid, phthalic acid, terephthalic acid, isophthalic acid, gallic acid, digallic acid, ascorbic acid, gluconic acid and anisic acid.

Examples of polyalcohols as guest molecules in the context of the novel use are C$_2$–C$_{30}$ aliphatic, C$_3$–C$_{30}$ olefinically unsaturated, C$_3$–C$_{30}$ cycloaliphatic and C$_6$–C$_{30}$ aromatic polyalcohols having 2 to 10 OH groups, such as ethylene glycol, propylene glycol, butylene glycol, hexylene glycol, cyclohexanediol, glycerol, adonitol, mono-, di- and tripentaerythritol, mannitol and sorbitol.

Examples of phenols as guest molecules in the context of the novel use are C$_6$–C$_{30}$ hydroxy aromatic compounds which may have further substituents, examples being phenol, naphthol, resorcinol, cresol, hydroquinones, picric acid, pyrogallol and phloroglucinol.

Examples of quinones as guest molecules in the context of the novel use are those having 6 to 30 carbon atoms, for example benzoquinone, naphthoquinone, anthraquinone, alizarin, phenanthrenequinone and acenaphthenequinone.

Examples of sugars as guest molecules in the context of the novel use are mono- or disaccharides, such as glucose, fructose, rhamnose, galactose, lactose, sucrose, mannose, xylose, allose, arabinose and polysaccharides such as cellobiose, starch or sorbose.

Examples of ethers as guest molecules in the context of the novel use are C$_2$–C$_{30}$ aliphatic, C$_3$–C$_{30}$ olefinically unsaturated, C$_4$–C$_{30}$ cycloaliphatic, C$_7$–C$_{30}$ araliphatic and aromatic ethers, such as diethyl ether, benzyl ether, furan, dioxane, dibutyl ether, diglycol, dimethoxyethane and diphenyl ether, and also polyethers having 3 to 100 ethoxy and/or propoxy units.

Examples of thiols as guest molecules in the context of the novel use are methane-, ethane-, propane-, isobutane-, n-butane-, 1,1-dimethylethane-, pentane-, hexane-, phenylmethane- and benzenethiol and thiocresol.

Examples of cyano compounds as guest molecules in the context of the novel use are acetonitrile, benzonitrile, malonitrile, cyanoacetic acid, propionitrile, capronitrile, dodecyl cyanide, succinonitrile and glutaronitrile.

Examples of nitro compounds as guest molecules in the context of the novel use are nitromethane, nitroethane, nitrobenzene, mono-, di- and trinitrotoluene, nitrophenol and nitroaniline.

Examples of primary, secondary and tertiary amines as guest molecules in the context of the novel use are ammonia, mono-$(C_1$–$C_{18})$-alkyl-, di-$(C_1$–$C_{18})$-alkyl- and tri-$(C_1$–$C_{18})$-alkyl-amines, where said alkyl radicals can also be olefinically mono- or polyunsaturated or can be substituted with OH, $NH_2$ or alkoxy; aniline, allylamine, mono-, di- or tri-methylamine, mono-, di- or tri-ethylamine, di- and triphenylamine, benzylamine, toluidine, anisidine, phenylenediamine, benzidine, urotropin, acridine, pyrrolidine, piperidine, morpholine, indole, piperazine, pyridine, picoline, quinoline, isoquinoline, pyrimidine, and also amino acids.

Examples of silicon compounds as guest molecules in the context of the novel use are tetramethylsilane, tetraethylsilane, tetraethylsilane, tetrapropylsilane, tetrabutylsilane, tetraphenylsilane, trimethylsilyl ethers and siloxanes.

Examples of sulfur compounds as guest molecules in the context of the novel use are dithiocarboxylic acids, diphenyl sulfides, benzenesulfonic acid, toluenesulfonic acid, dimethyl sulfoxide, sulfanilic acid, sulfanilamide, naphthalenesulfonic acid, phenylsulfonic acid, sulfolane, thiirane and thiophene.

Examples of phosphorus compounds as guest molecules in the context of the novel use are triethyl phosphate, triphenyl phosphate, triphenylphosphine oxide, hexamethylphosphoric triamide and diethyl phosphite.

Examples of ammonium compounds as guest ions in the context of the novel use are ammonium, tetramethyl-, tetraethyl-, tetrapropyl-, tetrabutyl- and tetraphenylammonium, diallyldimethylammonium, pyridinium, cetylpyridinium, fluoroalkyl$(C_1$–$C_{18})$ ammonium and anilinium.

Examples of inorganic cations as guest ions in the context of the novel use are $Li^+$, $Na^+$, $K^+$, $Rb^+$, $Cs^+$, $Mg^{2+}$, $Ca^{2+}$, $Sr^{2+}$, $Ba^{2+}$, $Ti^{2+}$, $Ti^{4+}$, $Zr^{2+}$, $Zr^{4+}$, $V^{3+}$, $V^{5+}$, $Cr^{3+}$, $Cr^{6+}$, $Mn^{2+}$, $Mo^{4+}$, $Fe^2$, $Fe^{3+}$, $Co^{2+}$, $Ni^{2+}$, $Cu^+$, $Cu^{2+}$, $Zn^{2+}$, $Al^{3+}$, where said metal cations can also be present in oxidation states other than those indicated. Furthermore, the inorganic cations may carry neutral or anionic ligands, for example $H_2O$, $CO$, $CN^-$, $NH_3$, $OH^-$, $O^{2-}$, $Cl^-$, $F^-$, $Br^\ominus$ and $I^\ominus$.

Examples of inorganic anions as questions in the context of the novel use are $NO_3^-$, $OH^-$, $HSO_4^-$, $S_4^{2-}$, $HSO_3^-$, $S_2^-$, $S^{2-}$, $SO_3^{2-}$, $S_2O_3^{2-}$, $HCO_3^-$, $CO_3^{2-}$, $H_2PO_4^-$, $HPO_4^{2-}$, $PO_4^{3-}$, $CN^-$, $CF_3SO_3^-$, $CF_3COO^-$, cyanate, isocyanate, $F^-$, $Cl^-$, $Br^-$, $I^-$, thiocyanate, zinc tetracyanate, zinc tetrathiocyanate, perchlorate, $PF_6^-$, molybdates, such as $MoO_4^{2-}$, thiomolybdates, such as $MoS_4^{2-}$ and tungstates, such as $WO_4^{2-}$, and also anions of heteropolyacids, such as molybdatophosphates, for example $P(Mo_3O_{10})_4^{3-}$, tungstophosphates, for example $P(W_3O_{10})_4^{3-}$, and silicomolybdates and $SiF_6^{2-}$.

Examples of boron compounds as guest ions in the context of the novel use are tetrafluoroborate, tetrachloroborate, tetraphenylborate, tetra(fluorophenyl)borate, tetra(chlorophenyl)borate, tetratolylborate, tetranaphthylborate, tetra(methoxyphenyl)borate, tetrabiphenylborate, tetrabenzylborate, tetra(perfluoroalkyl) phenylborate and tetrapyridylborate, where said aromatic radicals can be attached to the boron atom in the ortho-, meta- or para position.

Examples of organic anions as guest ions in the context of the novel use are ethyl sulfate, thiolate, phenolate, nitrophenolate, saturated or unsaturated, aliphatic or cycloaliphatic or aromatic carboxylate or sulfonate, preferably formate, lactate, tartrate, benzoate, the mono- or dianion of dithiodibenzoic acid, 4,4'-sulfonyldibenzoate, phthalate, terephthalate, isophthalate, sulfoisophthalate, salicylate, 2-hydroxy-3-naphthoate, 2-hydroxy-6-naphthoate, ethanesulfonate, mono- or dimethyl sulfate, phenylsulfonate or tosylate, and also perfluorinated, saturated or unsaturated, aliphatic or cycloaliphatic or aromatic carboxylate or sulfonate, preferably perfluoroacetate, perfluoro$(C_1$–$C_{30})$-alkylbenzoate, perfluoroethanesulfonate or perfluoro$(C_1$–$C_{30})$-alkylbenzenesulfonate, and also saturated or unsaturated, aliphatic or cycloaliphatic or aromatic di- and tricarboxylate or di- and trisulfonate, preferably citrate, oxalate and succinate, chlorinated or fluorinated aliphatic, cycloaliphatic or aromatic carboxylate, such as trifluoroacetate, and trifluorosulfonate.

Examples of betaines as guest molecules in the context of the novel use are disulfo-pyrrolidinium betaines of the formula (VI)

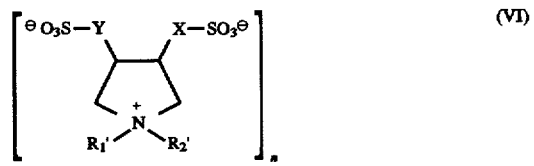

in which $R_1'$ and $R_2'$ are hydrogen, alkyl$(C_1$–$C_5)$ or alkoxy$(C_1$–$C_5)$ radicals, polyoxyalkylene radicals, preferably polyoxyethylene or polyoxypropylene radicals, or radicals of the formula (alkylene$(C_1$–$C_5)$—O)$_n$—R in which R is a hydrogen atom or an alkyl$(C_1$–$C_4)$ radical and n is a number from 1 to 10, and X and Y are each alkylene $(C_1$–$C_5)$.

The cyclically linked polysaccharides (host compounds) can consist of in each case identical or different monomeric sugar units, it being possible for the differences to be in structure and also in configuration. In particular, the oligosaccharide or polysaccharide may contain those monomeric sugar units which are enantiomeric or diastereomeric with respect to one another.

In the context of the present invention, preferred host compounds are cyclically linked polysaccharides consisting of in each case identical or enantiomeric saccharide units or of enantiomer mixtures of these units (race-mate), the radicals $R^1$, $R^2$, $R^3$ and X in each case being the same in all said saccharide units. Mixtures or mixed crystals of different cyclically linked polysaccharides are also of interest, as are mixtures of different cyclically linked polysaccharide enantiomers and polysaccharide racemates. These can be reacted with identical or different guest molecules G to form the corresponding inclusion compounds.

Also of interest are mixtures or mixed crystals of inclusion compounds with identical or different guest molecules G or guest ions.

In the context of the present invention, particular preference is given to 1,4-linked oligoglucosides or oligolactosides having 6 to 8 monomeric units, in which $R^1$, $R^2$ and $R^3$ are each OH, $OCH_3$, $OC_2H_5$, $OC_3H_7$, O-n-butyl, O-isobutyl, O-tert-butyl, O-mesyl or O-tosyl and X is —$CH_2OH$, —$CH_2OCH_3$, —$CH_2$O-tosyl or —$CH_2$O-mesyl.

Cyclically linked oligoglucosides are referred to in the literature as cyclodextrins. The designation alpha-, beta-, gamma-cyclodextrin depends on the number of cyclically linked saccharide monomers. A cyclically 1,4-linked oligosaccharide is called alpha-cyclodextrin if it consists of 6 saccharide monomers ($n^1=6$), beta-cyclodextrin if it consists of 7 saccharide monomers ($n^1=7$) and gamma-Cyclodextrin if it consists of 8 saccharide monomers ($n^1=8$). For the higher homologs, the nomenclature continues correspondingly in accordance with the Greek alphabet. 1,4-linked homologs where n<6 are unknown, since cyclization is not possible for steric reasons, but there are 1,6-linked homologs where $n^2=3$, 4 and 5.

Of very particular interest as host compounds are the following 1,4-linked cyclodextrins of the formula (I):

Host 1: $R^1$ and $R^2$ are OH, X is $CH_2OH$, $n^1$ is 6;
Host 2: $R^1$ and $R^2$ are OH, X is $CH_2OH$, $n^1$ is 7;
Host 3: $R^1$ and $R^2$ are OH, X is $CH_2OH$, $n^1$ is 8;

which form inclusion compounds of the formula (IV) or (V) with the guest compounds G below in their dissociated or un-dissociated form:

Compound 4: Host 3+G=LiCl
Compound 5: Host 3+G=$ZnCl_2$
Compound 6: Host 3+G=$SrCl_2$
Compound 7: Host 2+G=Octadecyl 3-(3,5-di-tert-butyl-4-hydroxyphenyl)-propionate
Compound 8: Host 3+G=$Na_2CO_3$
Compound 9: Host 2+G=$NaBF_4$
Compound 10: Host 2+G=$Zn(NO_3)_2$
Compound 11: Host 3+G=Dimethyldiallylammonium chloride
Compound 12: Host 3+G=$CdCl_2$
Compound 13: Host 3+G=$FeSO_4$
Compound 14: Host 2+G=Dimethyldiallylammonium chloride
Compound 15: Host 1+G=$Zn(NO_3)_2$
Compound 16: Host 1+G=Oxalic acid
Compound 17: Host 2+G=$NaB(C_6H_5)_4$
Compound 18: Host 2+G=$KNO_3$
Compound 19: Host 3+G=$Al(NO_3)_3$
Compound 20: Host 1+G=Coconutalkyldimethylbenzylammonium chloride
Compound 21: Host 3+G=$CoCl_2$
Compound 22: Host 1+G=Salicylic acid
Compound 23: Host 1+G=Stearic acid
Compound 24: Host 3+G=$MnSO_4$
Compound 25: Host 2+G=Triphenylamine
Compound 26: Host 2+G=Na trifluoromethane-sulfonate
Compound 27: Host 2+G=$CH_3COONa$
Compound 28: Host 2+G=p-Benzoquinone
Compound 29: Host 2+G=Anthracene
Compound 30: Host 2+G=2,5-Di-tert-butyl-hydroquinone
Compound 31: Host 2+G=Triethylamine
Compound 32: Host 2+G=Tetramethylphosphonium chloride
Compound 33: Host 2+G=Ferrocene
Compound 34: Host 2+G=$KPF_6$
Compound 35: Host 3+G=$K_2MoO_4$
Compound 36: Host 2+G=Ascorbic acid
Compound 37: Host 2+G=K sorbate
Compound 38: Host 2+G=Gluconic acid
Compound 39: Host 2+G=DL-malic acid
Compound 40: Host 2+G=Tripentaerythritol
Compound 41: Host 2+G=Adonitol
Compound 42: Host 2+G=Hydrindantine
Compound 43: Host 2+G=$Ca(NO_3)_2$
Compound 44: Host 3+G=$Ca(NO_3)_2$
Compound 45: Host 3+G=$CaSO_4$
Compound 46: Host 3+G=$ZrOCl_2$
Compound 47: Host 3+G=$Zn(NO_3)_2$
Compound 48: Host 1+G=$Al(NO_3)_3$
Compound 49: Host 2+G=$Al(NO_3)_3$
Compound 50: Host 1+G=Propionic acid
Compound 51: Host 2+G=Glycol bis[3,3-bis-(4'-hydroxy-3'-tert-butylphenyl)butanoate]
Compound 52: Host 2+G=Pentaerythritol tetrakis-[3,5-di-tert-butyl-4-hydroxyphenylpropionate]
Compound 53: Host 3+G=$MnCl_2$
Compound 54: Host 2+G=β,β'-thiodi(propionic acid laurylester)
Compound 55: Host 2+G=β,β'-thiodi(propionic acid stearylester)
Compound 56: Host 2+G=Dioctadecyl disulfide
Compound 57: Host 2+G=Tris(2,4-di-tert-butyl-phenyl) phosphite
Compound 58: Host 1+G=$C_{12}/C_{14}$-alkyltrimethylammonium-Cl
Compound 59: Host 2+G=$C_{12}/C_{14}$-alkyltrimethylammonium-Cl
Compound 60: Host 3+G=$C_{12}/C_{14}$-alkyltrimethylammonium-Cl
Compound 61: Host 1+G=Benzoic acid
Compound 62: Host 2+G=Coconutalkyldimethylbenzylammonium chloride
Compound 63: Host 3+G=Coconutalkyldimethylbenzylammonium chloride
Compound 64: Host 1+G=Didecyldimethylammonium chloride
Compound 65: Host 2+G=Didecyldimethylammonium chloride
Compound 66: Host 3+G=Didecyldimethylammonium chloride
Compound 67: Host 1+G=Didecyldimethylammonium propionate
Compound 68: Host 2+G=Didecyldimethylammonium propionate
Compound 69: Host 3+G=Didecyldimethylammonium propionate
Compound 70: Host 1+G=Poly(diallyldimethylammonium chloride)
Compound 71: Host 2+G=Poly(diallyldimethylammonium chloride)
Compound 72: Host 3+G=Poly(diallyldimethylammonium chloride)
Compound 73: Host 1+G=dimethyldiallylammonium chloride
Compound 74: Host 3+G=$K_2CO_3$
Compound 75: Host 3+G=$MgCl_2$
Compound 76: Host 1+G=N-(trihydroperfluoroalkene)-N,N,N-trialkylammonium methosulfate
Compound 77: Host 2+G=N-(trihydroperfluoroalkene)-N,N,N-trialkylammonium methosulfate Compound 78: Host 3+G=N-(trihydroperfluoroalkene)-N,N,N-trialkylammonium methosulfate Compound 79: Host 2+G=2,4,5,2',3',4'-hexahydroxybenzophenone Compound 80: Host 2+G=2,4,6-trihydroxybenzoic acid Compound 81: Host 2+G=1,1,1-trihydroxymethylethane and in each case their enantiomers and mixtures with one another.

The preparation of the cyclically linked polysaccharides has been described in many instances in the literature. (Beilstein "Handbuch der Organischen Chemie" [Handbook of organic chemistry]; Syst. No. 3011, 5th supplementary work Vol. 19/12; Angew. Chem. 92 (1980) 343, D. French, M. L. Levine, J. H. Pazur, E. Norberg J. Am. Chem. Soc. 71 (1949) 353.) In one typical variant, the cyclic oligosaccharides are synthesized by reacting starch with cultures of Bacillus macerans. The individual cyclic systems can be separated from the mixture by fractional crystallization or by chromatographic methods. Individual derivatives are nowadays already commercially available. They are marketed under the name alpha-, beta- or gamma-cyclodextrin or Schardinger dextrins. The various substituted compounds are typically prepared by procedures known from the literature, from the cyclic oligosaccharides (X=$CH_2OH$ and $R^1/R^2$=OH), by derivatization with suitable reagents (Angew. Chem. 103 (1991) 94, Angew. Chem. 1994 (106), 851). Further derivatives and their preparation are described in Chem. Ber. 102 (1969) 494–498. In addition to the 1,4 linkage as shown in formula (I), other ring linkages are also possible (Angew. Chem. 106 (1994), 363), which also allow smaller rings, for example n=3. In this case derivatization is carried out essentially via the respective monomer units prior to cyclization.

The preparation of the inclusion compounds is known from the literature: M. L. Bender, M. Komiyama; Cyclodextrin Chemistry, Springer Verlag, Berlin 1978.

F. Cramer et al.; Die Naturwissenschaften 54 (1967) 625.

G. Wenz; Angew. Chem. 106 (1994) 851.

P. Klüfters et al.; Angew Chem. 106 (1994) 1925.

W. Saenger; Angew. Chem. 92 (1980) 343.

Water-soluble substances, for example, can be reacted directly with aqueous, cyclically linked polysaccharide solutions in equimolar quantities or a multiple excess, under hot or cold conditions, to form the desired inclusion compound.

Water-insoluble compounds can be dissolved in an organic solvent and stirred or shaken with organic or aqueous solutions of the cyclically linked polysaccharides.

It is also possible to prepare such inclusion compounds by kneading or flushing with suitable kneading apparatus, extruders or mixers, with the components being made into a paste and very thoroughly mixed.

Under alkaline synthesis conditions, complete or partial deprotonation of the OH groups of the cyclically linked polysaccharide takes place. With metal ions, metal polyolates are formed in which the alkoxide oxygen atoms of the saccharides are bridged via metal ions.

The formation of the inclusion compound can be detected by differential thermal analysis (DTA). The melting and decomposition temperatures and energies of the inclusion compound are different from those of the pure host component.

Depending on their structure, the cyclically linked polysaccharides have a different reaction to inclusions. Thus, in addition to 1:1 incorporation, other stoichiometric relationships may also occur depending on the concentration or reaction conditions. In this context, channel or cage structures are possible in whose cavities the components G are lodged.

The novel inclusion compounds are, surprisingly, widely applicable charge control agents which can be matched precisely to the particular resin/toner system. This represents a great advantage over the pure host compounds. A further advantage is that the compounds employed in accordance with the invention are colorless and possess particularly high and constant charge control properties, good thermal stabilities and very good dispersibility properties. A great technical advantage of these very readily dispersible compounds is that they are inert toward the various binder systems and can therefore be employed widely.

In addition to their suitability in toners, the novel inclusion compounds are highly suitable as charge control agents and charge improvers in powders and coatings as well, especially powder coatings, in particular since they do not adversely affect (accelerate) the gel time during thermal crosslinking of the powder coatings ("baking").

Special advantages of the compounds according to the invention are their high activity, excellent thermal stability and general resin compatibility. A factor particularly important for industrial use is the very good dispersibility, making it possible overall to achieve a high level of efficiency. A further advantage is that the synthesis of the inclusion compounds and their dispersion in the binder can be carried out in one working step. After forming a paste from the precursors these can be dispersed in the binder system using kneading apparatus, mixers, extruders or roller beds at temperatures above the softening point, the synthesis of the inclusion compounds taking place simultaneously.

Dispersion denotes the distribution of one substance in another, i.e. in the context of the invention the distribution of a charge control agent in the toner binder, powder-coating binder or electret material.

Depending on the specific material properties of the charge control agent, which may be crystalline, semi- or partially crystalline or amorphous under X-ray analysis, optimum and excellent dispersion means homogeneous distribution of the charge control agent in the respective binder.

Thus it is known that in their coarsest form crystalline substances are present as agglomerates. To achieve homogeneous distribution in the binder, these agglomerates must be disrupted by the dispersion operation into smaller aggregates or, ideally, into primary particles.

The charge control agent particles present in the binder after dispersion should be smaller than 1 μm, preferably smaller than 0.5 μm, with a narrow particle-size distribution being of advantage.

Depending on the energy input, substances are referred to as being of easy or difficult dispersibility. The dispersibility is closely linked with the materials-specific, chemico-physical properties. Determinants are structure;

morphology of the solids;

modification/crystallization;

particle size and distribution;

nature and form of the surface;

aftertreatment of the substance, for example milling, drying;

finish or surface covering.

For the dispersion of a charge control agent, easy dispersibility means 1. that the charge control agent particles can easily be disrupted by mechanical forces (for example by extrusion, kneading), 2. that the charge control agent particles are wetted equally well by the binder in their disrupted and undisrupted form, 3. that the charge control agent particles in their disrupted form are homogeneously distributed, i.e. distributed with statistical uniformity over all volume elements of the binder, and 4. that this state of homogeneous distribution is retained and is not subsequently altered in the binder by migration or recrystallization effects.

In terms of its dispersion properties, the chemico-physical properties of a charge control agent are essentially associated with:

particle size;

aftertreatment/milling and also drying;

crystallinity;

thermal stability;

moisture content.

For the particle size, defined by the $d_{50}$ value, there are optimum ranges of effectivity depending on the material. For example, large particles (>5 mm) can in some cases not be dispersed at all or can be dispersed only with a considerable investment of time and energy, whereas very fine particles in the submicron range harbour a heightened safety risk, such as the possibility of dust explosion.

The particle size and form is established and modified either by the synthesis and/or by aftertreatment. The required property is frequently possible only through controlled aftertreatment, such as milling/drying. It is also possible hereby for the crystallinity to be influenced, which can be detected and ascertained by way of the X-ray diffraction diagram.

The binder systems mentioned in the present invention are typically hydrophobic materials. High water contents in the charge control agent can either oppose wetting or else promote dispersion (flushing). The practicable moisture content is therefore specific to the particular material.

The novel inclusion compounds have the following chemico-physical properties:

1. The water content, determined by the Karl-Fischer method, is between 0.001% and 30%, preferably between 0.01 and 25% and, with particular preference, between 0.1 and 20%, it being possible for the water to be adsorbed and/or bonded and for its proportion to be adjusted by the action of heat up to 200° C. and vacuum to $10^{-8}$ torr or by addition of water.

2. The particle size, determined by means of the Coulter counter method or laser light diffraction and defined by the $d_{50}$ value, is between 0.01 µm and 3000 µm, preferably between 0.1 and 1000 µm and, with very particular preference, between 0.5 and 100 µm.

3. The crystallinity of the compounds, determined by the X-ray diffraction method, is highly crystalline to partly crystalline or else amorphous under X-rays, preferably highly crystalline to partly crystalline, and is recognizable by pronounced reflections in the X-ray diffraction diagram recorded with values of 2θ in the range from 2 to 80.

Particularly preferred inclusion compounds have the following properties:

a) A breakdown resistance, determined at 1 kHz, of between $1\times10^3$ ohm×cm and $9\times10^{16}$ ohm×cm, preferably between $1\times10^5$ ohm×cm and $9\times10^{15}$ ohm×cm;

b) a dielectric loss factor tan delta, determined at 1 kHz, of between $9\times10^{-1}$ and $1\times10^{-3}$, preferably between $5\times10^{-1}$ and $5\times10^{-3}$, and c) a dielectric constant epsilon of between 1 and 20, preferably between 3 and 15.

A thermal stability, determined by differential thermal analysis at a constant heating rate of 3K/min, of greater than 200° C.

The present invention also provides inclusion compounds consisting of a host compound, which is a cyclically linked polysaccharide having 3 to 100 monomeric saccharide units and forming a cavity in its molecular framework, and of one or more chemical compounds enclosed as guest compound (s) in this cavity, having a solids particle size of between 0.1 µm and 1000 µm, preferably from 0.5 µm to 100 µm, with a water content of between 0.1 and 20%, determined by the Karl-Fischer method, and with a thermal stability of more than 200° C.

The present invention provides, furthermore, a process for the preparation of an inclusion compound, which comprises reacting the cyclically linked polysaccharide with the guest compound at a pH of from 7 to 14, preferably from 8 to 12, and subjecting the resulting inclusion compound to spray-drying or to drying and milling. The molar ratios of host to guest compound can vary when preparing the inclusion compounds within wide limits, for example between 0.1:10 and 10:0.1.

Depending on the conditions of the synthesis, its products are frequently coarsely crystalline particles which must be subjected to aftertreatment, for example milling. A variety of milling techniques are suitable for this purpose. Examples of advantageous mills are airjet mills, cutting mills, hammer mills, bead mills and impact mills. The important factor is that the action of milling results in a narrow particle size. Preference is given to a range $\Delta$ ($d_{95}$–$d_{50}$) of less than 500 µm, in particular less than 200 µm. Instead of milling, spray-drying may also be expedient.

Cyclodextrin inclusion compounds may have birefringent properties: compounds 18 and 24 in particular are distinguished by the fact that, as birefringent particles, favored by a low level of crystal symmetry, they rotate the plane of polarization of polarized light.

For the abovementioned compounds 4 to 81, without intending any limitation to these compounds, it can be shown in test toners that the addition of 1% by weight of the inclusion compounds is able to direct the triboelectric chargeability in very small steps as a function of time. For the triboelectric tests, whose results are summarized in Table 1 below, 1% of hosts 1 to 3 and compounds 4 to 81 were dispersed homogeneously 60:40 in a styrene-methacrylate copolymer toner binder using a kneading apparatus. The carriers used are magnetite particles or ferrite particles coated with styrene-methacrylate copolymer and having a size of from 50 to 200 µm (bulk density 2.62 g/cm³) (FBM 100 A; from Powder Techn.).

TABLE 1

Time-dependently determined g/m values [µC/g] of inclusion compounds 1 to 81, dispersed 1% in the toner binder and activated with carriers. min denotes minutes and h denotes hours (atmospheric humidity 40 to 60%); *denotes a heating rate of 10 K/min.

| Host | 10 min | 30 min | 2 h | 24 h | DTA [°C.] | H₂O [%] |
|---|---|---|---|---|---|---|
| Host 1 | −13 | −18 | −21 | −24 | >240 | 8.4 |
| Host 2 | −11 | −19 | −22 | −25 | >240 | 8.0 |
| Host 3 | −10 | −15 | −18 | −20 | 272 | 7.6 |
| Compd. | | | | | | |
| 4 | −16 | −24 | −22 | −18 | 209 | 12.4 |
| 5 | −14 | −22 | −20 | −14 | 203 | 8.6 |

TABLE 1-continued

Time-dependently determined q/m values [μC/g] of inclusion compounds 1 to 81, dispersed 1% in the toner binder and activated with carriers. min denotes minutes and h denotes hours (atmospheric humidity 40 to 60%); *denotes a heating rate of 10 K/min.

| Host | 10 min | 30 min | 2 h | 24 h | DTA [°C.] | H$_2$O [%] |
|---|---|---|---|---|---|---|
| 6 | −13 | −23 | −26 | −23 | 209 | 11.1 |
| 7 | −17 | −27 | −29 | −26 | 285 | 3.7 |
| 8 | −12 | −17 | −20 | −24 | 299 | 11.7 |
| 9 | −30 | −27 | −21 | −16 | 231 | 7.3 |
| 10 | −30 | −33 | −29 | −20 | 297 | 5.2 |
| 11 | −27 | −26 | −25 | −18 | 298 | 7.7 |
| 12 | −17 | −24 | −25 | −24 | 203 | 12.0 |
| 13 | −13 | −18 | −21 | −21 | 243 | 7.5 |
| 14 | −19 | −19 | −14 | −14 | 271 | 9.8 |
| 15 | −17 | −22 | −24 | −24 | 297 | 6.3 |
| 16 | +1 | +4 | +6 | 0 | 238 | 7.0 |
| 17 | −11 | −16 | −20 | −22 | 214 | 7.9 |
| 18 | −27 | −30 | −27 | −20 | 246 | 3.7 |
| 19 | −12 | −14 | −15 | −14 | 281* | 7.7 |
| 20 | −21 | −21 | −18 | −9 | 277 | 6.0 |
| 21 | −3 | −5 | −8 | −19 | 193 | 8.5 |
| 22 | −3 | −4 | −6 | −13 | 201 | 7.1 |
| 23 | −3 | −5 | −6 | −13 | 216 | 4.8 |
| 24 | −2 | −4 | −6 | −14 | 250 | 10.1 |
| 25 | −2 | −3 | −4 | −4 | 251 | 8.5 |
| 26 | −6 | −8 | −10 | −15 | 266 | 5.2 |
| 27 | −6 | −9 | −13 | −21 | 288 | 11.7 |
| 28 | −7 | −11 | −15 | −19 | 218 | 9.2 |
| 29 | −4 | −10 | −13 | −14 | 225 | 8.8 |
| 30 | −1 | −4 | −8 | −13 | 203 | 6.2 |
| 31 | −1 | −4 | −7 | −14 | 225 | 9.1 |
| 32 | 0 | −2 | −6 | −7 | 275* | 9.7 |
| 33 | −1 | −3 | −7 | −13 | 270* | 6.7 |
| 34 | −1 | −2 | −6 | −12 | 294* | 9.9 |
| 35 | −8 | −12 | −16 | −8 | 269 | 5.2 |
| 36 | −4 | −7 | −9 | −10 | 280* | 7.8 |
| 37 | −4 | −7 | −13 | −12 | 261* | 7.1 |
| 38 | −4 | −6 | −11 | −13 | 280* | 10.6 |
| 39 | −3 | −5 | −8 | −8 | 200* | 9.6 |
| 40 | −3 | −5 | −10 | 11 | 218* | 11.3 |
| 41 | −15 | −21 | −21 | −13 | 209* | 9.5 |
| 42 | −11 | −15 | −17 | −13 | 262* | 9.5 |
| 43 | −12 | −13 | −17 | −10 | 244* | 10.4 |
| 44 | −15 | −19 | −19 | +1 | 234* | 5.3 |
| 45 | −3 | −5 | −8 | −9 | 236 | 8.0 |
| 46 | −3 | −5 | −8 | −16 | 145 | 5.6 |
| 47 | −17 | −21 | −24 | −10 | 300* | 4.1 |
| 48 | −12 | −12 | −13 | −11 | 260° c. | 3.0 |
| 49 | −11 | −14 | −15 | −14 | >300* | 4.4 |
| 50 | −2 | −5 | −7 | −15 | >200 | 9.0 |
| 51 | −2 | −5 | −10 | −18 | 284 | 8.3 |
| 52 | −4 | −7 | −18 | −19 | 275 | 8.1 |
| 53 | −10 | −18 | −22 | −22 | 197 | 10.9 |
| 54 | −2 | −5 | −10 | −20 | 238 | 3.3 |
| 55 | −3 | −6 | −10 | −20 | 237 | 3.9 |
| 56 | −6 | −9 | −14 | −21 | 289 | 4.2 |
| 57 | 0 | +1 | +5 | +6 | 287 | 4.6 |
| 58 | −11 | −12 | −9 | −6 | 285 | 11.5 |
| 59 | −8 | −10 | −11 | −9 | 276 | 10.5 |
| 60 | −17 | −19 | −19 | −9 | 291 | 4.1 |
| 61 | −5 | −8 | −12 | −18 | 225 | 5.6 |
| 62 | −4 | −5 | −5 | −6 | 274 | 7.9 |
| 63 | −10 | −9 | −6 | −1 | 302 | 2.9 |
| 64 | −16 | −19 | −13 | −3 | 288 | 5.2 |
| 65 | −5 | −6 | −4 | −2 | 278 | 5.8 |
| 66 | −13 | −14 | −10 | −5 | 305 | 4.8 |
| 67 | −10 | −13 | −11 | −3 | 254 | 5.5 |
| 68 | −3 | −3 | −2 | −6 | 286 | 6.1 |
| 69 | −3 | −5 | −2 | −2 | 298 | 5.7 |
| 70 | −5 | −9 | −14 | −23 | 273 | 5.5 |
| 71 | −6 | −10 | −15 | −23 | 286 | 10.8 |
| 72 | −4 | −8 | −15 | −20 | 274 | 8.5 |
| 73 | −1 | −4 | −6 | −6 | 277 | 7.3 |
| 74 | −6 | −10 | −14 | −22 | 302 | 13.2 |
| 75 | −4 | −6 | −10 | −20 | 186 | 12.8 |
| 76 | 0 | −1 | −3 | −7 | 318 | 4.5 |
| 77 | −10 | −14 | −16 | −14 | 182 | 4.0 |
| 78 | −8 | −11 | −11 | −11 | 318 | 5.3 |
| 79 | −5 | −8 | −14 | −14 | 240* | 8.6 |
| 80 | −5 | −7 | −12 | −14 | 277* | 9.7 |
| 81 | −6 | −10 | −14 | −19 | 240* | 6.2 |

It can be seen from Table 1 that the inclusion compounds have predominantly negative triboelectric charge control effects, although by an appropriate choice of component G it is also possible to generate a positive tribo-electric charging of the binder matrix relative to the host (e.g. compounds 16 and 57). With a few exceptions, all of the inclusion compounds have very high thermal stabilities. The dispersion properties and the charge control properties such as charge level, constancy and sign are stable over a wide range of moisture contents, so that the inclusion compounds used in accordance with the invention are able to compensate for fluctuating ambient conditions, for example atmospheric humidity. Furthermore, the q/m values demonstrate that by an appropriate choice of component G it is possible within a broad range to choose the basic triboelectric formulation necessary for the toner-processing copier.

A particular advantage over the pure host compounds is the possibility of selectively adjusting the tribo-electric charging of the binder to the desired level.

Therefore, by selecting the concentration of the inclusion compound and the guest molecule G, a modular system is available which can be combined as desired to achieve a specific aim and which allows the user a maximum of application flexibility in fine-tuning the desired triboelectric charging in the system employed.

Depending on the application it is possible to choose the particular charge control agent whose level of charging is most effective for the target application and which can be dispersed with the greatest ease. For instance, for powder coating applications an enhanced thermal stability is advantageous in order, for example, to prevent yellowing (for example compound 10, 11, 15, 49, 60, 66).

In copiers there is often a requirement for rapid attainment of an electrostatic level. Compounds 9, 10 and 11 in particular show marked advantages in short-term charging over the pure host compound.

Furthermore, toner systems are employed in practice which preadjust the sign of the electrostatic toner charge by the choice of carrier/binder but which additionally require charge control agents for the level and long-term stability of the charge. What are required here, in particular, are charge regulating properties independent of the absolute level of charging. This property is possessed in particular by compounds 25, 42, 19, 59 and 69. This is a further advantage over the pure host compounds, whose values cannot be chosen so selectively.

The high level of efficiency becomes particularly clear in comparison with other polysaccharides. Thus xanthans having molecular masses of around 2 million, which are formed from β1,4-bonded glucose units (formula VII: Römpp, 9th edition, Vol. 6, p. 5075)

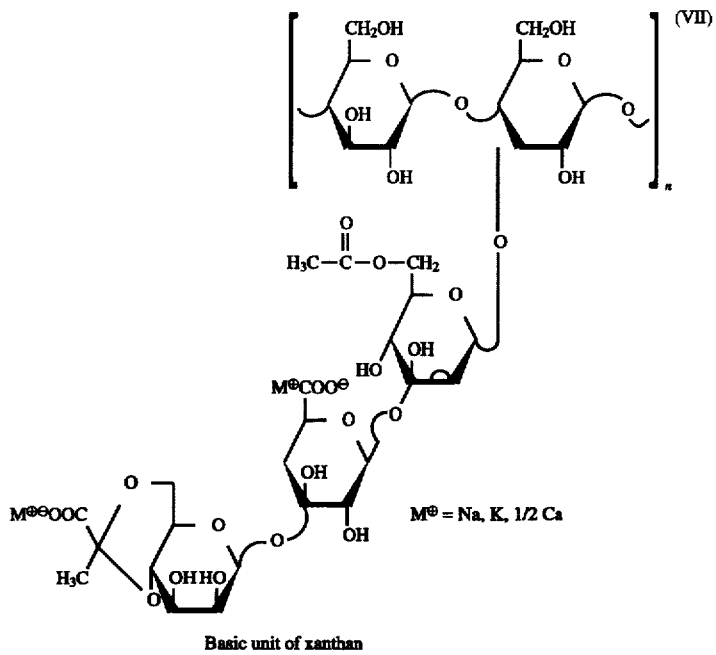

Basic unit of xanthan show no efficiency whatsoever and little thermal stability. Like cyclodextrins, xanthans can bind cationic ions such as $Na^\oplus$ and $K^+$ in the form of salts, but do not form a cavity. This structural disadvantage evidently leads to low triboelectrical efficiency in comparison to inclusion compounds. For instance, a xanthan bearing the trade name ®Rhodopol (Rhone-Poulenc), incorporated and measured in analogy to Use Example 1, exhibits a charge which is −1 μC/g after 10 minutes, −3 μC/g after 30 minutes, −7 μC/g after 2 hours and −17 μC/g after 24 hours (Comparison Example: 2).

A 1% strength test toner of the above composition starts to undergo distinct brown discoloration even at 150° C., which is evidence of the low thermal stability, while a test toner comprising, for example, compound 4 remains completely clear, i.e. transparent, above 200° C. and shows no discoloration caused by decomposition. A distinct improvement in chargeability and the associated higher deposition rate can also be seen very clearly in powder coating binders. Whereas the pure binder has a chargeability of from 1.8 to 2.5 μA and, associated therewith, a deposition rate of 63% (Comparison Example 3), the chargeability can be improved to 2.3–2.9 μA and the deposition rate to 72% by adding 18% by weight of compound 18 (Use Example 2). Because of the high transparency of the coating material in the melted and fully cured state, the compounds employed in accordance with the invention are also particularly suitable for powder coatings.

The compounds used in accordance with the invention are incorporated homogeneously, for example by extrusion or kneading, individually or in combination with one another in a concentration of from 0.01 to 50% by weight, preferably from 0.5 to 20% by weight, particularly preferably from 0.1 to 5.0% by weight, based on the overall mixture, into the binder of the respective toner, developer, coating material, powder coating, electret material or of the polymer which is to be electrostatically separated. In this context the compounds employed in accordance with the invention can be added as dried and milled powders, dispersions or solutions, press cakes, masterbatches, preparations, made-up pastes, as compounds applied from aqueous or nonaqueous solution to appropriate carriers, for example silica gel, $TiO_2$, $Al_2O_3$, or in some other form. Similarly, the compounds used in accordance with the invention can also in principle be added even during the preparation of the respective binders, i.e. in the course of their addition polymerization, polyaddition or polycondensation.

The present invention yet further provides an electrophotographic toner, powder or powder coating comprising a customary toner binder, for example an acrylic or polyester resin containing epoxide, carboxyl and hydroxyl groups, or a combination of these resins, and from 0.01 to 50% by weight, preferably from 0.5 to 20% by weight and, with particular preference, from 0.1 to 5% by weight of at least one of the inclusion compounds mentioned.

In the case of processes for the electrostatic separation of polymers and, in particular, of (salt) minerals, the charge control agents can also be applied, in the above-mentioned quantities, externally, i.e. to the surface of the material to be separated.

The level of electrostatic charging of the electrophotographic toners or of the powder coatings in which the charge control agents according to the invention are homogeneously incorporated cannot be predicted and is measured in standard test systems under uniform conditions (same dispersion times, same particle-size distribution, same particle form) at about 20° C. and 50% relative atmospheric humidity. Electrostatic charging of the toner takes place by vortexing with a carrier, i.e. a standardized friction partner (3 parts by weight of toner per 98 parts by weight of carrier), on a roller bench (150 revolutions per minute). The electrostatic charging is then measured on a customary q/m measurement stand (J. H. Dessauer, H. E. Clark, "Xerography and related Processes", Focal Press, N.Y., 1965, page 289; J. F. Hughes, "Electrostatic Powder Coating", Research Studies Press Ltd., Letchworth, Hertfordshire, England, 1984, Chapter 2). In determining the q/m value or the triboelectric charging of powder coatings, the particle size has a great influence, and for this reason great attention is paid to a uniform particle-size distribution in the case of the powder coating or toner samples obtained by screening. Thus for toners the aim is for a mean particle size of 10 μm whereas for powder coatings a mean particle size of 50 μm is practicable.

Triboelectric spraying of the powders (or powder coatings) is carried out using a spray apparatus having a standard spray tube and a star-shaped insert at maximum powder throughput with a spray pressure of 3 bar. For this purpose the object to be sprayed is suspended in a spray booth and sprayed directly from the front from a distance of about 20 cm without further movement of the spray apparatus. The particular charging of the sprayed powder is then measured with a measuring instrument for measuring the triboelectric charge of powders from Intec (Dortmund). For the measurement, the measuring antenna of the measuring instrument is held directly in the cloud of powder emerging from the spray apparatus. The current strength resulting from the electrostatic charge of the powder coating or powder is indicated in μA. The deposition rate is then determined in % by obtaining the difference in weight between the powder coating sprayed out and that deposited.

In the following examples, min means minutes and h means hours.

USE EXAMPLE 1

(electrostatic testing)

Using a kneading apparatus, 1 part of the compound 4 is incorporated homogeneously over 45 minutes into 99 parts of a toner binder (styrene-methacrylate copolymer 60:40). The mixture is then milled on a laboratory universal mill and subsequently classified on a centrifugal classifier. The desired particle fraction (4 to 25 μm) is activated with a carrier which comprises magnetite particles with a size of from 50 to 200 μm (bulk density 2.62 g/cm$^3$) (FBM 100 A; from Powder Techn.) coated with styrene-methacrylate copolymer.

Measurement is carried out on a customary q/m measurement stand. By using a sieve having a mesh size of 25 μm it is ensured that no carrier is entrained when the toner is blown out. Measurements are carried out at 50% relative atmospheric humidity. The q/m values [μC/g] are measured as a function of the activation time.

Hosts 1 to 3 and compounds 5 to 81 are incorporated and measured in the same way.

USE EXAMPLE 2

(testing of powder coating)

1 part of compound 18, 17 or 9 is incorporated as described in Use Example 1 into the styrene/acrylate resin. The particle fraction >25 μm obtained after classification is triboelectrically sprayed using a spray gun at an air pressure of 3 bar and 5 bar, and the chargeability and deposition rate are determined:

| Compound | Pressure [bar] | Current [μA] | Deposition rate [%] |
|---|---|---|---|
| 18 | 3 | 1.5–1.8 | 72% |
| | 5 | 2.3–2.9 | 72% |
| 17 | 3 | 1.5–1.6 | 63% |
| | 5 | 3.7–2.6 | 74% |
| 9 | 3 | 1.7–1.9 | 62% |
| | 3 | 3.0–3.6 | 67% |

Comparison Example 1

(electrostatic testing)

For measurement using the pure styrene-acrylate toner binder (styrene-methacrylate copolymer 60:40) the procedure of Use Example 1 is repeated but without kneading in additives (resin blank value). The toner binder is activated with a carrier which consists of magnetite particles with a size of from 50 to 200 μm (bulk density 2.62 g/cm$^3$) (FBM 100 A; from Powder Techn.) which are coated with styrene-methacrylate copolymer

| Activation period | Charging q/m [μC/g] |
|---|---|
| 10 min | −7 |
| 30 min | −11 |
| 2 h | −16 |
| 24 h | −22 |

Comparison Example 2

(electrostatic testing)

1 part of Rhodopol is incorporated and measured in accordance with Use Example 1:

| Activation period | Charging q/m [C/g] |
|---|---|
| 10 min | −1 |
| 30 min | −3 |
| 2 h | −7 |
| 24 h | −17 |

Comparison Example 3

(testing of powder coating)

The pure styrene/acrylate binder ®Dialac S309 without additives is homogenized by kneading, milled and classified as described in Use Example 1. The fraction >25 μm is, for spraying as a powder coating, sprayed with a spray gun and measured as described in Use Example 2:

| Compound | Pressure [bar] | Current [μA] | Deposition rate [%] |
|---|---|---|---|
| Resin | 3 | 1.8–2.5 | 57% |
| | 5 | 2.6–4.0 | 67% |

Preparation Example 1 (general form)

0.02 mol of the cyclically linked polysaccharide is employed. For the reaction component G is dissolved or suspended in deionized water, organic solvent or an aqueous/organic medium. The cyclically linked polysaccharide in dissolved, suspended or solid form is metered into this solution/suspension. Subsequent stirring, assisted if desired by heating, completes the reaction. In a preferred variant, the reaction can be accelerated by the addition of a base such as NaOH, $Na_2CO_3$ or $NH_4OH$. In this case the pH established is from 7 to 14, preferably from 8 to 12.

The reaction is complete when a clear solution has formed. The clear reaction solutions are separated from the solvent, for example by evaporation, distillation or spray drying, and the resulting solid is dried at elevated temperature, assisted if desired by vacuum and drying agents, and is milled.

Successful synthesis can be detected by a change in the thermal properties, for example using differential thermal analysis, relative to the pure cyclically linked polysaccharide.

The process described above was used to prepare compounds 4 to 81.

Preparation Example 2

(compound 4)

0.84 g of LiCl (0.02 mol) is dissolved in 60 ml of deionized water. 12.9 g of host 3 in solid form are stirred into this solution. By heating at from 30° to 100° C., preferably from 50° to 80° C., a clear solution develops which, after cooling, remains clear and of thinly liquid consistency. The water is stripped off in vacuo at from 30° to 100° C., preferably from 60° to 90° C., and the white solid which remains is isolated and milled.

DTA: 209° C.; $d_{50}$=33.3 µm; $d_{95}$<100 µm;

$H_2O$: 12.4%; intense reflections in the region (2θ) from 15 to 19 and 20 to 24.

To remove further water, the solid can be dried again in vacuo at elevated temperature.

13.3 g of the inclusion compound are isolated.

Preparation Example 3
(compound 17)

In a further variant, 11.95 g of host 2 (0.01 mol) are dissolved at room temperature in 614 ml of deionized water. To this solution is added, with stirring, a solution of 3.42 g of sodium tetraphenylborate (0.01 mol) in 31 ml of deionized water. A clear solution is maintained, which is subsequently heated to 70° C. and, after cooling, concentrated in vacuo.

The residue is then dried in vacuo at elevated temperature to constant weight, to leave 14.3 g of a white pulverulent inclusion compound.

DTA: 214° C.; $d_{50}$=23.3 µm; $d_{95}$<100 µm;

$H_2O$: 7.9%; intense reflection in the region (2θ) from 10 to 15 and 17 to 22.

Preparation Example 4
(compound 18)

23.9 g of host 2 (0.02 mol) are suspended with 13.3 g of $KNO_3$ (0.13 mol) in 200 ml of deionized water. The solution is subsequently adjusted to a pH of 11 with aqueous NaOH (33% strength), heated to 40°–80° C., preferably to 60° C., and stirred for 30 minutes. After heating a clear solution is formed. The solvent is distilled off in vacuo and the residue which remains is dried in vacuo at from 60° C. to 140° C. to constant weight, to leave 35 g of a white solid.

DTA: decomposition 246° C.; $d_{50}$=23.9 µm; $d_{95}$<100 µm;

$H_2O$: 3.7%; intense reflections at (2θ) 17 to 36.

Preparation Example 5
(compound 10)

11.95 g of host 2 (0.01 mol) are dissolved with 19.73 g of $Zn(NO_3)_2 \cdot 6H_2O$ (0.07 mol) in 100 ml of deionized water. The solution is subsequently adjusted to a pH of 10 with aqueous NaOH (33% strength), heated to 40°–80° C., preferably to 60° C., and stirred for 30 minutes. After heating a clear solution is formed. The solvent is distilled off in vacuo and the residue which remains is dried in vacuo at 80° C. to constant weight, to leave 27.2 g of a white solid.

DTA: 297° C.; $d_{50}$=4.2 µm; $d_{95}$<100 µm;

$H_2O$: 5.2%; intense reflections in the region (2θ) from 27 to 39.

We claim:

1. An inclusion compound used as a charge control agent comprising:
   a host compound, said host compound is a cyclically linked polysaccharide having 3 to 100 monomeric saccharide units and forming a cavity in its molecular framework, and
   at least one chemical compound in said cavity as a guest compound, said guest compound is selected from the group consisting of:
   $C_1$–$C_{30}$ aliphatic alcohols, $C_2$–$C_{30}$ olefinically unsaturated alcohols, $C_3$–$C_{30}$ cycloaliphatic alcohols, $C_3$–$C_{30}$ olefinically unsaturated carboxylic acids, fatty acids, $C_4$–$C_{30}$ olefinically unsaturated dicarboxylic acids, $C_8$–$C_{30}$ aromatic dicarboxylic acids, $C_2$–$C_{30}$ aliphatic polyalcohols having 2 to 10 OH groups, $C_3$–$C_{30}$ olefinically unsaturated polyalcohols having 2 to 10 OH groups, $C_3$–$C_{30}$ cycloaliphatic polyalcohols having 2 to 10 OH groups, $C_6$–$C_{30}$ aromatic polyalcohols having 2 to 10 OH groups, $C_6$–$C_{30}$ hydroxy aromatic compounds, quinones having 6 to 30 carbon atoms, monosaccharides, disaccharides, $C_2$–$C_{30}$ aliphatic ethers, $C_3$–$C_{30}$ olefinically unsaturated ethers, $C_4$–$C_{30}$ cycloaliphatic ethers, $C_7$–$C_{30}$ araliphatic ethers, aromatic ethers, polyethers having 3 to 100 ethoxy or propoxy units or a combination thereof, amino acids, tetraphenylborate, disulfopyrrolidinium betaines of the formula (VI)

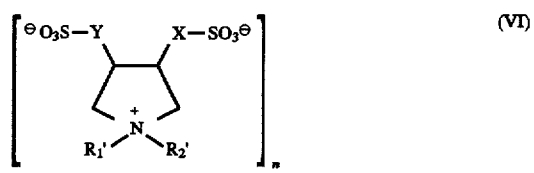

in which $R_1{}^{1'}$ and $R_2{}'$ are hydrogen, alkyl ($C_1$–$C_5$) or alkoxy ($C_1$–$C_5$) radicals, polyoxyalkylene radicals, or radicals of the formula (alkylene-($C_1$–$C_5$)—O)$_n$—R in which R is a hydrogen atom or an alkyl($C_1$–$C_4$) radical and n is a number from 1 to 10 and X and Y are each alkylene($C_1$–$C_5$), octadecyl 3-(3,5-di-tert-butyl-4-hydroxyphenyl)-propionate, $Zn(NO_3)_2$, $NaB(C_6H_5)_4$, coconutalkyldimethylbenzylammonium chloride, Na trifluoromethanesulfonate, tetramethylphosphonium chloride, $KPF_6$, $K_2MoO_4$, ascorbic acid, K sorbate, gluconic acid, DL-malic acid, tripentaerythritol, adonitol, hydrindantine, $Al(NO_3)_3$, glycol bis[3,3-bis (4'-hydroxy-3'-tert-butylphenyl)-butanoate], pentaerythritol tetrakis [3,5-di-tert-butyl-4-hydroxyphenylpropionate], β,β'-thiodi(propionic acid laurylester), β,β'-thiodi(propionic acid stearylester), tris(2,4-di-tert-butylphenyl) phosphite, $C_{12}/C_{14}$-alkyltrimethylammonium-Cl, didecyldimethylammonium chloride, didecylmethylalkoxyammonium propionate, poly(diallyldimethylammonium chloride), N-(trihydroperfluoroalkene)-N,N,N-trialkylammonium methosulfate, 2,4,6-trihydroxybenzoic acid and 1,1,1-trihydroxymethylethane.

2. The compound as claimed in claim 1, wherein said host compound is a 1,4-linked pyranose of the formula (I)

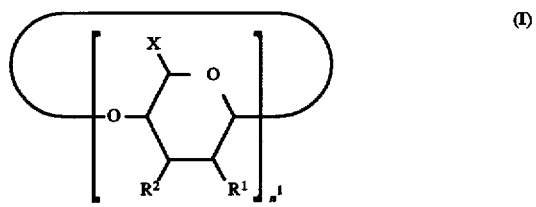

or a 1,6-linked pyranose of the formula (II)

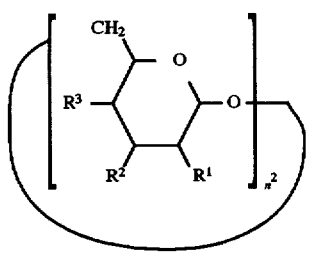

in which n¹ is a number from 6 to 100, n² is a number from 3 to 100, $R^1$, $R^2$ and $R^3$ independently of one another are identical or different and are hydroxyl; branched or unbranched, cyclic or open-chain $C_1$–$C_{30}$-alkoxy; branched or unbranched, cyclic or open-chain $C_2$–$C_{30}$-alkenoxy, where the alkoxy and alkenoxy radicals mentioned are optionally partly or completely fluorinated; unsubstituted —O-aryl ($C_6$–$C_{30}$), or —O-aryl ($C_6$–$C_{30}$) which is substituted with 1 to 5 $C_1$–$C_{30}$-alkyl radicals $C_1$–$C_{30}$-alkoxy radicals; —O—($C_1$–$C_4$)-alkyl-($C_6$–$C_{30}$) aryl; —O—$C_{60}$–$C_{70}$-fullerene; —O-(alkylene ($C_0$–$C_{30}$)—Y-alkyl ($C_1$–$C_{30}$))$_x$, —O-(aryl ($C_6$–$C_{30}$)—Y-aryl ($C_6$–$C_{30}$))x, —O-(aryl-($C_6$–$C_{30}$)—Y-alkyl($C_1$–$C_{30}$))$_x$, —O-(alkylene-($C_0$–$C_{30}$)—Y-aryl ($C_6$–$C_{30}$)-alkyl ($C_0$–$C_4$))$_x$, where x is 1 to 30 and Y is a chemical bond, O, S, SO, $SO_2$, $PR^4$, $PR^4_3$, Si, $SiR_2^4$ or $NR^4$ and the radicals $R^4$ are hydrogen, $C_1$–$C_4$-alkyl or $C_1$–$C_4$-alkoxy; a radical —O—$COR^6$ in which $R^6$ is OH, saturated or unsaturated, branched or unbranched, cyclic or open-chain $C_1$–$C_{18}$-alkyl, partially fluorinated or perfluorinated ($C_1$–$C_{18}$)-alkyl, phenyl, $C_1$–$C_{18}$-alkyl-phenyl; a radical —O—$PR^7_2$ or —O—$PR^7_4$ in which $R^7$ is hydrogen, methyl, ethyl, propyl, butyl, vinyl, allyl, isopropyl, isobutyl, neopentyl, tert-butyl, cyclohexyl, cyclopentyl, phenyl, tolyl, benzyl, partially fluorinated or perfluorinated alkyl-($C_1$–$C_{18}$), and also O, OH, S and $NR^8_2$ in which $R^8$ is hydrogen, $C_1$–$C_8$-alkyl or phenyl; a radical —O—$SO_2R^9$ in which $R^9$ is methyl, ethyl, propyl, butyl, vinyl, allyl, isopropyl, isobutyl, neopentyl, tert-butyl, cyclohexyl, cyclopentyl, phenyl, tolyl, benzyl, partially fluorinated or perfluorinated alkyl-($C_1$–$C_{18}$), O, $OR^8$, S or $NR^8_2$; a radical —O—$SiR^{10}_3$ in which $R^{10}$ is methyl, ethyl, propyl, butyl, vinyl, allyl, isopropyl, isobutyl, neopentyl, tert-butyl, cyclohexyl, cyclopentyl, phenyl, tolyl, partially fluorinated or perfluorinated alkyl-($C_1$–$C_{18}$), O, $OR^8$, S or $NR^8_2$; a radical —O—$BR^{11}_2$ in which $R^{11}$ is methyl, ethyl, propyl, butyl, vinyl, allyl, isopropyl, isobutyl, neopentyl, tert-butyl, cyclohexyl, cyclopentyl, phenyl, tolyl, partially fluorinated or perfluorinated alkyl-($C_1$–$C_{18}$), O, OH, $OR^8$, S or $NR^8_2$; an amino radical of the formula —$NH_2$, —$NHR^{12}$ or —$NR^{12}_2$ in which each $R^{12}$ is identical or different and is the radical of a $C_1$–$C_{30}$ aliphatic, $C_7$–$C_{60}$ araliphatic or $C_6$–$C_{30}$ aromatic hydrocarbon which is optionally interrupted by from 1 to 3 hetero-atoms selected from the group consisting of N, O and S; an alkyl ($C_1$–$C_{18}$) which is perfluorinated or partly fluorinated; or in which the nitrogen atom of the amino radical is part of a saturated or unsaturated, aromatic or nonaromatic 5- to 7-membered ring system, which optionally contains further heteroatoms chosen from nitrogen, oxygen, sulfur or a combination thereof, in the ring, and can be modified by fused attachment to or bridging to further ring systems; or an ammonium radical —$NR^{12}_4{}^+A^-$ in which $A^-$ is an inorganic or organic anion; or an azide radical —$N_3$; or in which the radicals $R^1$ and $R^2$, or $R^2$ and $R^3$, together form a ring system of the formula

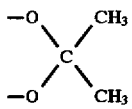

and

X is —$CH_2R^1$, —$CH_2$—$NO_2$, —$CH_2$—Hal, where Hal is halogen, —$CH_2OH$, —$CH_2OCH_3$, —$CH_2OCO$($C_1$–$C_4$)alkyl, —$CH_2$—O—$SiR_3^4$, —$CH_2$—O-trityl, —COOH, —COO—($C_1$–$C_4$)alkyl, —$CH_2$—O—$SO_2$—($C_1$–$C_4$)-alkyl or —$CH_2$—O—$SO_2$—$C_6H_4$—($C_1$–$C_4$)-alkyl.

3. The compound as claimed in claim 2, wherein n¹ is a number from 6 to 80, n² is a number from 3 to 60, $R^1$, $R^2$ and $R^3$ independently of one another are —O—($C_2$–$C_3$-alkylene-O)$_x$—$R^5$ in which $R^5$ is hydrogen, $C_1$–$C_4$-alkyl, acetyl, benzoyl or naphthoyl and x is a number from 1 to 30; —PO(OH)$_2$ or —PO—(O—$C_6H_5$)$_2$.

4. The compound as claimed in claim 2, wherein $R^1$, $R^2$ and $R^3$ independently of one another are hydroxyl, methoxy, ethoxy, propyloxy, isopropyloxy, n-butyloxy, isobutyloxy, tert-butyloxy, vinyloxy, allyloxy, phenoxy, benzyloxy, —O—$CF_3$, —O—($CH_2CH_2$—O)$_x$—$R^5$, —O—$COR^{13}$ in which $R^{13}$ is $C_1$–$C_8$-alkyl, phenyl or $C_1$–$C_8$-alkyl-phenyl; or an ammonium group —$NR^{14}R^{15}$ in which $R^{14}$ and $R^{15}$ independently of one another are hydrogen, methyl, ethyl, n-propyl, isopropyl, n-butyl, isobutyl, tert-butyl, allyl, vinyl, phenyl, benzyl or tolyl or in which the nitrogen atom is part of a piperidyl, morpholinyl, pyridinium or quinolinium ring system; or an ammonium group —$N^{\oplus}HR^{14}R^{15}A^{\ominus}$ in which $A^{\ominus}$ is a borate, sulfate, chloride, bromide, nitrate, cyanide, phosphate, carbonate, acetate or alcoholate anion, and X is —$CH_2Cl$, —$CH_2Br$, —$COOCH_3$, —$CH_2$—O—Si($CH_3$)$_3$, —$CH_2$—O—$SO_2$—$CH_3$ or —$CH_2$—O—$SO_2$—$C_6H_4CH_3$.

5. The compound as claimed in claim 2, wherein the host compound is a 1,4-linked cyclo-dextrin of the formula (I) in which $R^1$ and $R^2$ are each OH, X is $CH_2OH$ and n¹ is a number from 6 to 8.

6. The compound as claimed in claim 2, wherein the host compound is a 1,4-linked pyranose of the formula (I) in which $R^1$ and $R^2$ are OH, X is $CH_2OH$, and n¹ is 8 and the guest compound is dimethyldiallylammonium chloride.

7. The compound as claimed in claim 1, wherein said cyclically linked polysaccharide consists of in each case identical or enantiomeric saccharide units or of enantiomer mixtures of these units in which the radicals $R^1$, $R^2$, $R^3$ and X in each case have the same meaning.

8. The compound as claimed in claim 1, wherein a mixture or a mixed crystal of inclusion compounds with identical or different guest compounds is employed.

9. The compound as claimed in claim 1, having a solids particle size of between 0.1 μm and 1000 μm with a water content of between 0.1 to 20%, determined by the Karl-Fischer method, and with a thermal stability of more than 200° C.

10. The compound as claimed in claim 9, wherein the particle size is from 0.5 μm to 100 μm.

11. An electrophotographic toner comprising a customary toner binder and from 0.01 to 50% by weight of at least one inclusion compound as claimed in claim 1.

12. An electrographic toner comprising a customary toner binder and from 0.5 to 20% by weight, of at least one inclusion compound as claimed in claim 1.

13. A powder or powder coating comprising a polyester or acrylic resin containing epoxide, carboxyl or hydroxyl groups, or a combination of these resins, and from 0.01 to 50% by weight of at least one inclusion compound as claimed in claim 1.

14. A powder or powder coating comprising a polyester or acrylic resin containing epoxide, carboxyl or hydroxyl groups, or a combination of these resins, and from 0.5 to 20% by weight of at least one inclusion compound as claimed in claim 1.

* * * * *